US010121315B2

(12) United States Patent
Hodgson

(10) Patent No.: US 10,121,315 B2
(45) Date of Patent: Nov. 6, 2018

(54) GAMING MACHINE AND METHOD OF PLAY HAVING A MINIMUM AWARD THRESHOLD

(71) Applicant: Incredible Technologies, Inc., Vernon Hills, IL (US)

(72) Inventor: Lawrence J. Hodgson, Kildeer, IL (US)

(73) Assignee: INCREDIBLE TECHNOLOGIES, INC., Vernon Hills, IL (US)

( * ) Notice: Subject to any disclaimer, the term of this patent is extended or adjusted under 35 U.S.C. 154(b) by 172 days.

(21) Appl. No.: 14/724,528

(22) Filed: May 28, 2015

(65) Prior Publication Data

US 2015/0348365 A1 Dec. 3, 2015

Related U.S. Application Data

(60) Provisional application No. 62/003,862, filed on May 28, 2014.

(51) Int. Cl.
*A63F 13/00* (2014.01)
*G07F 17/32* (2006.01)

(52) U.S. Cl.
CPC .......... *G07F 17/3244* (2013.01); *G07F 17/32* (2013.01); *G07F 17/326* (2013.01); *G07F 17/3262* (2013.01); *G07F 17/3267* (2013.01)

(58) Field of Classification Search
None
See application file for complete search history.

(56) References Cited

U.S. PATENT DOCUMENTS

| | | | | |
|---|---|---|---|---|
| 8,622,811 B1 * | 1/2014 | Aoki | G07F 17/3244 463/16 |
| 2003/0102625 A1 * | 6/2003 | Katz | A63F 3/06 273/138.1 |
| 2009/0088241 A1 * | 4/2009 | Reed | G07F 17/3244 463/25 |
| 2009/0124335 A1 * | 5/2009 | Watkins | G07F 17/32 463/20 |
| 2010/0120491 A1 * | 5/2010 | McLaughlin | G07F 17/3209 463/20 |
| 2010/0120505 A1 * | 5/2010 | Caputo | G07F 17/3262 463/20 |
| 2015/0080116 A1 * | 3/2015 | Jhanb | G07F 17/3258 463/27 |

* cited by examiner

*Primary Examiner* — Jason Yen
(74) *Attorney, Agent, or Firm* — George S. Pavlik; Husch Blackwell LLP

(57) ABSTRACT

A gaming machine and method of play providing a minimum award threshold. The machine and method can determine whether a first game outcome corresponds to a predetermined outcome corresponding to a prize and setting a current minimum prize equivalent to the value of the prize. Where a subsequent game outcome corresponds to an outcomes associated with a prize, the value of the prize for the subsequent game outcome can be compared against the current minimum prize. Where the value of the prize for the subsequent game outcome is greater than the current minimum prize, the current minimum prize can be reset to the value of the prize for the subsequent game outcome.

24 Claims, 3 Drawing Sheets

GAMING MACHINE AND METHOD OF PLAY HAVING A MINIMUM AWARD THRESHOLD

CROSS REFERENCE TO RELATED APPLICATION

This application claims the benefit of U.S. Provisional Patent Application Ser. No. 62/003,862 filed May 28, 2014, the entirety of which is hereby incorporated by reference as if fully set forth herein.

FIELD

The subject invention pertains generally to an improved electronic gaming machine ("EGM") and method of play and more particularly to a machine and method providing a minimum award threshold.

BACKGROUND

Electronic gaming machines ("EGMs") are generally well known and have been relatively popular, and profitable, for a number of years. Such machines can be configured to offer a variety of casino or entertainment games, including for example, mechanical or electromechanical slot-type matching games, video games or electronic casino games, such as video poker, blackjack, keno, roulette, etc. As is generally known, such machines can accept wagers and compute a random game outcome from a group of potential outcomes. Some random outcomes can include both predetermined winning and non-winning/losing outcomes, with winning outcomes paying a multiple of a wager back to the player and non-winning outcomes paying nothing.

Although EGMs are well known in the art, it is desirable to offer players incentives to continue to play by making them more exciting and/or offering configurations which present the player with greater opportunity and perceived chances of winning. As will be understood by persons of ordinary skill in the art, embodiments presented herein address these desires.

DETAILED DESCRIPTION

Figure 1:
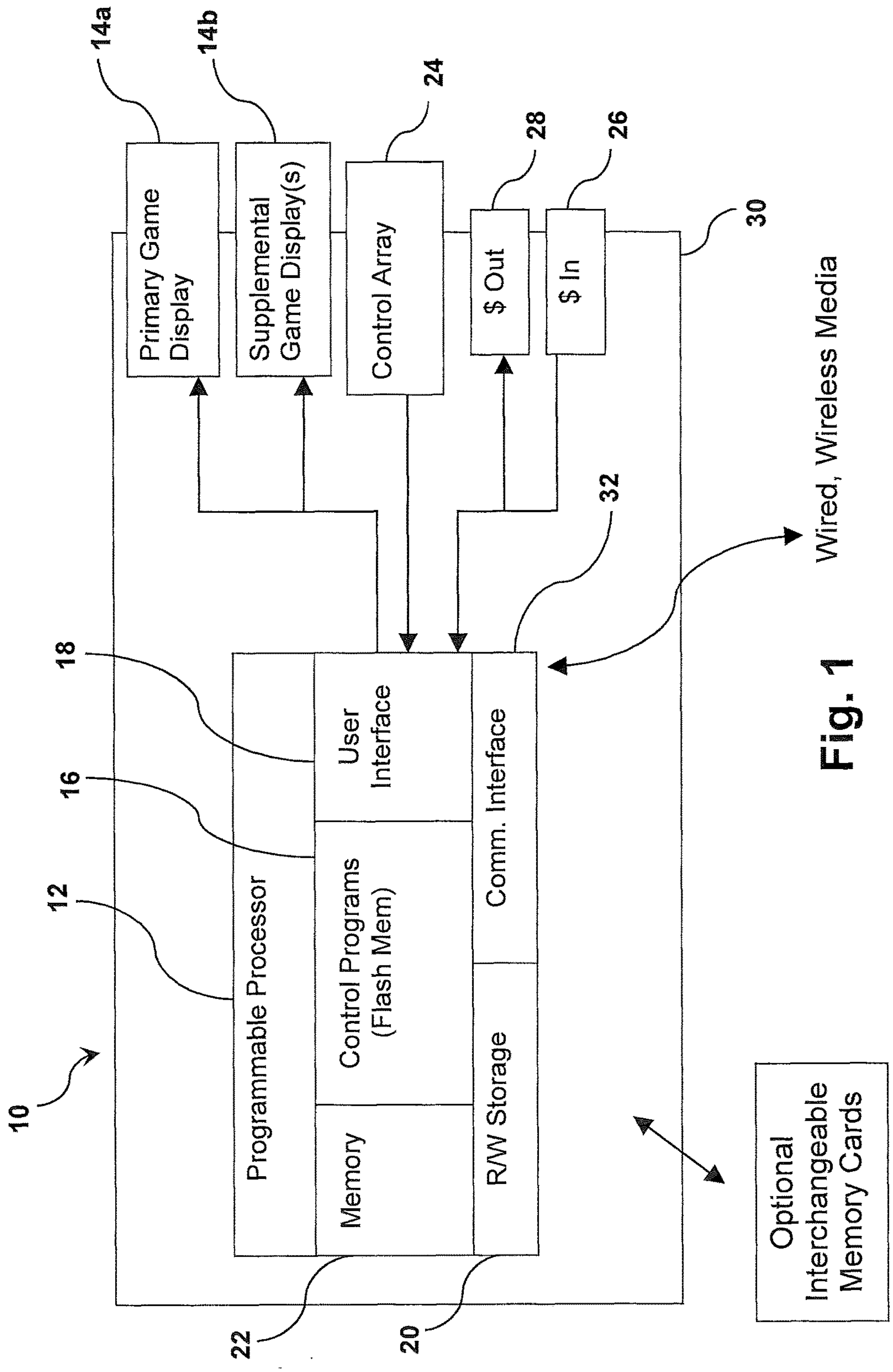
FIG. 1 is a block diagram illustrating the elements of an electronic gaming machine ("EGM") according to embodiments of the subject invention.

While this invention presented herein is susceptible of embodiment in many different forms, there are shown in the drawings, and will be described herein in specific detail, embodiments thereof with the understanding that the present disclosure is to be considered as an exemplification of the principles of the invention and is not intended to limit the invention to the specific embodiments illustrated. For example, although the following description describes embodiments in connection with a stand-alone electronic gaming device, it will be recognized that embodiments can also be practiced as part of an online gaming system played on any electronic device (including, but not limited to, a computer, tablet, or smartphone) that can be connected to an electronic network, including but not limited to the global computer network ("Internet"). It will further be understood that embodiments described herein can be carried out or implemented in connection with game or gaming machines that do not require an initial wager from a player, such as for example arcade or amusement-type redemption games.

Generally, embodiments of the subject invention relate to a gaming machine and method of play which can establish a minimum award threshold through activation of a triggering event. Once a minimum award threshold is triggered, the game can compare subsequent game awards to the minimum award threshold and can award a player the award having the higher value. Where a subsequent game award has a greater value than the minimum award threshold, the game can additionally reset the minimum award threshold to the higher value award.

With reference now to the figures, FIG. 1 illustrates an EGM 10 according to embodiments of the subject invention. The EGM 10 can include a programmable processor 12 (such as for example a microprocessor or microcontroller) operatively coupled to one or more game displays 14*a*, 14*b*. The processor 12 can include control programs 16 and associated control circuitry and be operatively connected to a user interface 18 with input/output circuits and at least one storage unit 20 which can store a plurality of instructions executable by the processor 12. The processor 12 can also include memory 22 which can include a main memory containing dynamic information processed by the processor 12 during operation, and/or a static memory which contains fixed information, such as, for example, an operating system, game programs, and a configuration of information necessary for the processor 12 to register and execute input from a player through a control array 24.

The displays 14*a*, 14*b* can include any kind of electronic display device suitable for visually presenting dynamic video images or representations of a game played on the EGM 10. The displays 14*a*, 14*b* can be CRT, LCD, plasma or LED display devices or monitors and can be physically enclosed in the same housing or cabinet 30 as the processor 12 or can be a located outside the cabinet 30 and be operatively coupled to the processor 12. The displays 14*a*, 14*b* can additionally include touch screen capabilities for receiving input from a player.

The processor 12 can execute the control programs 16 to perform primary functions for play the game, such as for example, randomly selecting game outcomes from a plurality of possible outcomes, recognizing a particular outcome as a predetermined winning or non-winning outcome and/or determining a reward amount associated with a particular winning outcome. The processor 12 can additionally control the game displays 14*a*, 14*b* by generating static or dynamic video for presentation thereon.

The control array 24 can include one or more input devices, such as for example, a keyboard, mechanical lever, a touch-screen, push buttons or pads and/or any other means for control, or desired combination of controls, able to accept input from a player and produce output to the game display 14*a*, 14*b* in response to a player's input. Where embodiments of the subject invention are practiced or provided in connection with a wagering game, the gaming machine 10 can further include a credit input device 26, such as for example a coin or bill acceptor or card reader and a payout device 28. The credit input device 26 and payout device 28 can be operatively connected to the processor 12 and when money or other credits are deposited in connection with a game, the control program 16 can instruct the payout device to issue an award in response to the selection of certain predetermined winning outcomes of the game. The reward or payoff can be provided in any form, including for example, coins, bills, credits, points, cards, tickets or coupons.

The gaming machine 10 can additionally feature communication capabilities for electrically transmitting signals, including control signals, game data or detected conditions to a remote electronic device such as for example, a computer, network or display device, dedicated storage device, or other mobile electronic device such as a PDA, smart phone, notebook computer or electronic tablet. Such communication capabilities can include a communication interface 32 that can connect the EGM 10 to external electronic devices via wired or wireless communication.

Figure 2:
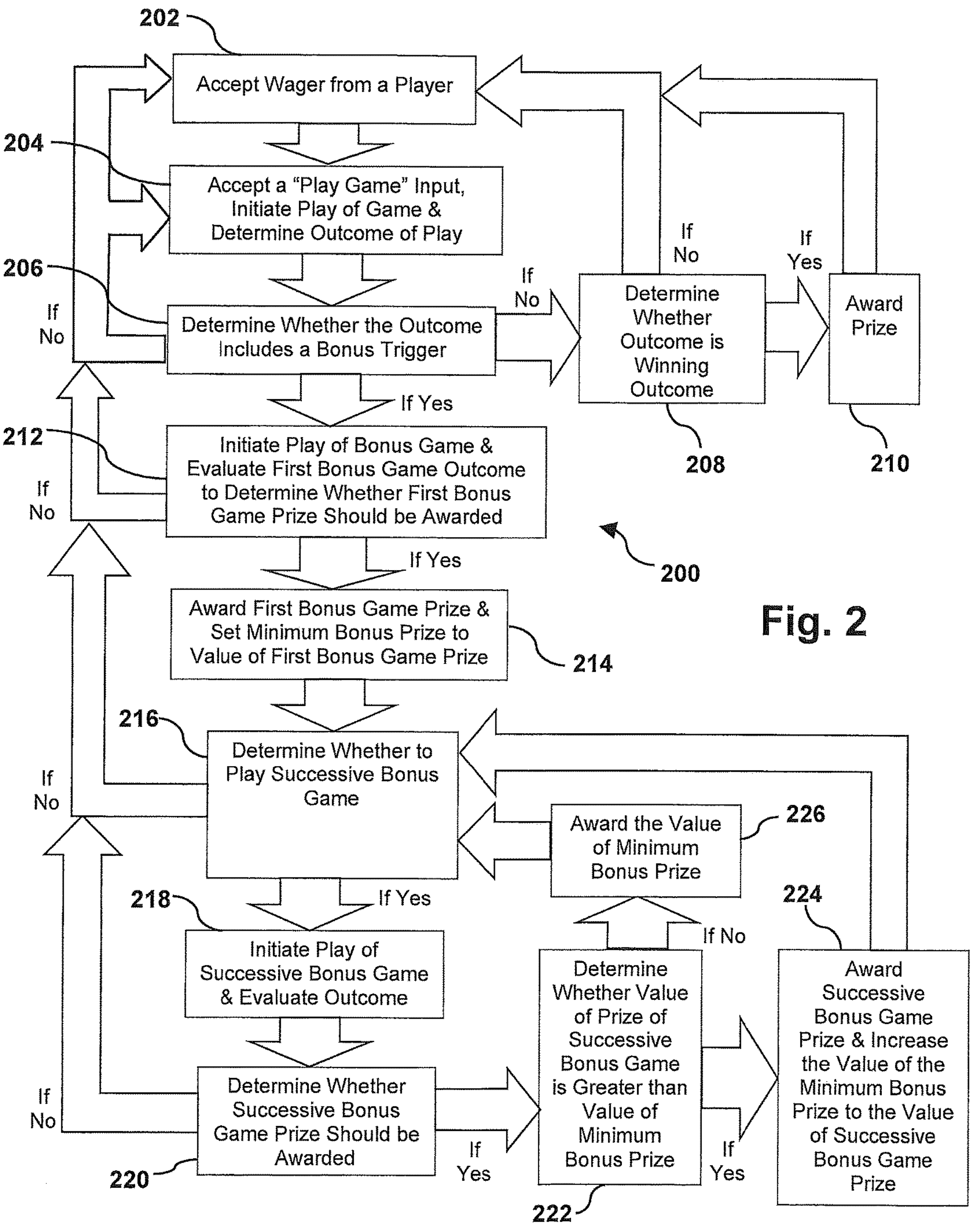
FIG. 2 is a flow diagram illustrating a first method according to embodiments disclosed herein.

FIG. 2 illustrates a method 200 according to embodiments disclosed herein. According to such method, the EGM can accept 202 a wager from a player. A "Play Game" input can be accepted 204 from the player to initiate play of the game and an outcome of a single play of the main game can be determined. In Step 206, the EGM can make a determination as to whether the outcome of the single play includes a bonus trigger. If not, the EGM can proceed to Step 208 to determine whether the outcome of the main game is a winning outcome, and if a winning outcome is produced, the game can award 210 a prize. If a winning outcome of the main game is not a winning outcome and does not trigger a bonus game, the game can return to Step 200 and await a new wager.

Where the outcome of the main game produces a bonus trigger, the EGM can proceed to Step 212 to initiate play of a first bonus game and evaluate the outcome of the first bonus game to determine whether a bonus game prize should be awarded. Where the outcome of the first bonus game results in the award of a bonus prize, the EGM can award the first bonus prize and also set a current minimum bonus prize to the same value of the first bonus prize. The EGM can then proceed to Step 216 and can determine whether it is appropriate to play an additional or subsequent bonus game. According to embodiments described herein, this can be a fixed determination (e.g., the prize may be a fixed number of free spins), or can be determined randomly (e.g. if a replay triggering event occurs in the play of the first bonus game, a later bonus game will be appropriate.)

Where a determination is made to play successive bonus games, the EGM can loop between determining a plurality of later bonus game outcomes and making additional evaluations as described below.

The EGM can initiate 218 play of a successive bonus game and evaluate the outcome of such game to determine 220 whether a winning outcome has been produced by the successive bonus game. Where a winning outcome has been produced, the game can determine 220 whether the value of the prize produced from the winning outcome of the successive bonus game is larger than the current minimum bonus prize. Where the value of the prize for the successive bonus game is larger, the value of the current minimum bonus prize can be increased 222 to the value of the prize due for the winning outcome of the successive bonus game and that prize can be awarded to the player. If the value of the prize produced from the winning outcome of the successive bonus game is not larger than the current minimum bonus prize, the game can award 226 the current minimum bonus prize.

According to embodiments presented herein, the play of any successive bonus game can result in the award of at least the value of the current minimum bonus prize. Alternatively, embodiments of the subject invention can require that any successive bonus game outcome be a winning outcome before any prize is awarded. And if such requirement exists, and a winning outcome is produced, the game can award the greater of the prize corresponding to the successive bonus game outcome or the current minimum bonus prize. Thus, the difference is that in the first instance, once any later bonus game is played, the player can get at least the value of the current minimum bonus prize. In the second instance, however, a player can be awarded if the successive bonus game outcome is a winning outcome, in which case the award can be the at least the value of the current minimum bonus prize.

Following the result of a successive bonus game and an award or adjustment of the current minimum bonus prize, the game can again determine whether to play another bonus game 216. If so, Steps 218 and 220 can be repeated to determine whether the successive bonus game is a winning outcome and can further award and adjust the minimum bonus prize the as illustrated in Steps 222 and 224 (or 226) of FIG. 2. If the game determines that it is not appropriate to play a successive bonus game, the game can return to Step 200 to accept a new wager or to Step 204 to initiate play of a new main game.

Figure 3:
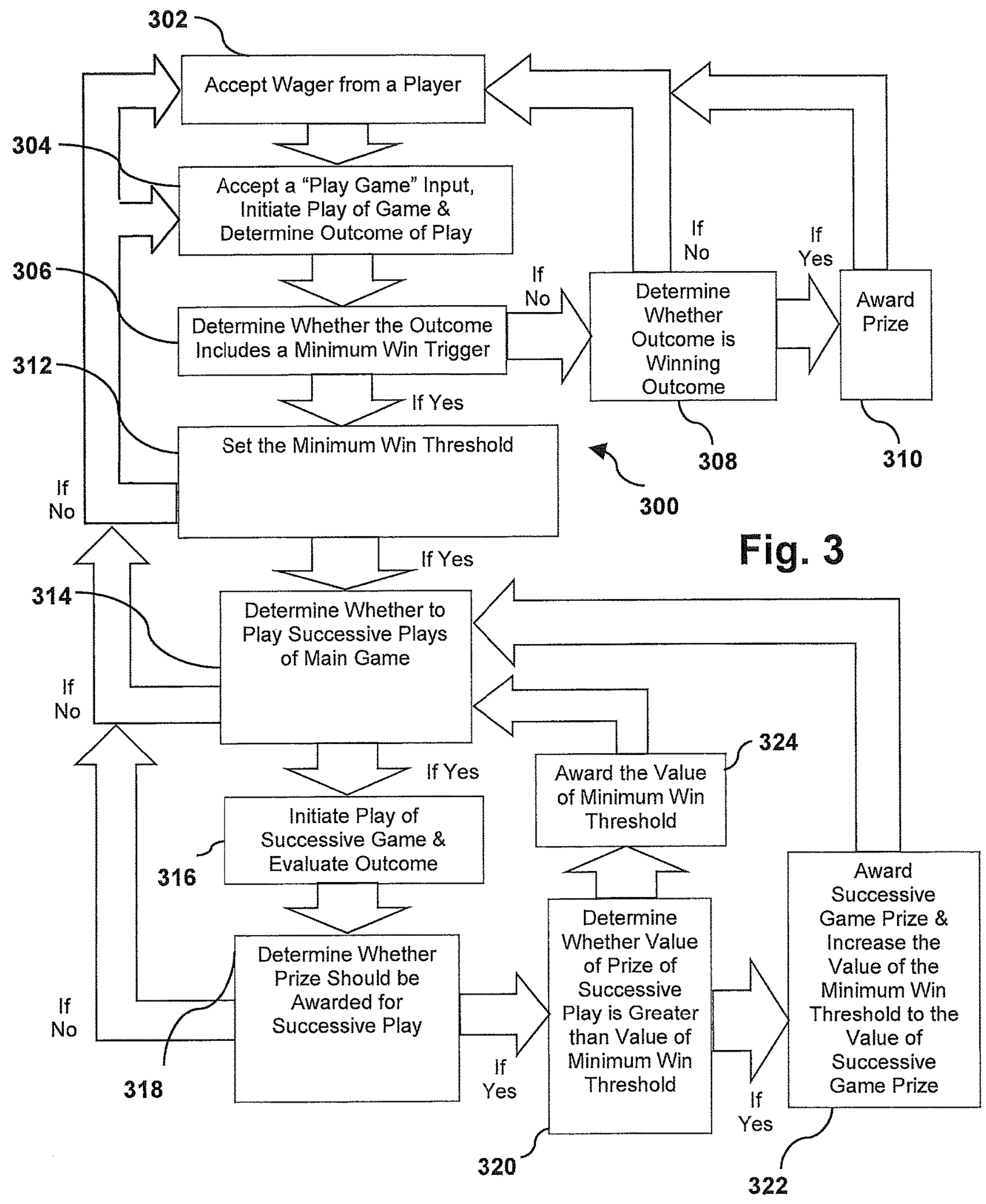
FIG. 3 is flow diagram illustrating a second method according to embodiments disclosed herein.

Turning now to FIG. 3, another method 300 is illustrated according to embodiments presented herein. Such method 300 features providing a minimum award threshold as a feature of the primary or main game. According to such embodiment, the EGM can accept 302 a wager from the player and can further accept 304 a "Play Game" input to initiate play and determine the outcome of a single play of the main game. In Step 306, the EGM can make a determination as to whether the outcome of the single play includes a minimum win trigger. If not, the EGM can proceed to Step 308 to determine whether the outcome is a winning outcome, and award 310 a main game prize which can be due if the outcome of the single play results in the same. The game can then return to Step 302 to await a new wager.

Where the outcome of the single play includes a minimum win trigger, the game can set 312 the minimum win threshold and determine the circumstances under which it will apply. According to one embodiment, the minimum win trigger can be independent of whether the play of the main game which activates the minimum win trigger was a winning outcome. According to such embodiment, the minimum win trigger can initiate a minimum win activation period, which can last until some minimum win terminating event has occurred. Such terminating event can include, for example, a certain number of plays of the main game, a certain number of winning or non-winning plays of the main game, a bonus game trigger, a minimum win terminating trigger, the passage of a certain amount of time, or any other desired terminating event. During the minimum win activation period, if a win occurs, the minimum win can either be set to the value of that win (if it was lower, or undefined) or the game can override the value of the win with a higher value prize which can be awarded instead.

Alternatively, the minimum win trigger can take effect only if the play of the main game which activates it is a winning outcome. (or, in other words, if the main game outcome is not a winning one, the outcome can be treated as if the minimum win is reset to zero and the minimum win activation period was immediately terminated). According to another alternative embodiment of the method described in FIG. 3, the EGM can be configured so that the minimum win trigger only occurs if the current main game outcome is a winning outcome, and the minimum win is set to whatever the value of the winning outcome is. Thus, this embodiment is different from the first previously described embodiment of FIG. 3 in that the EGM can be configured so as not to allow an outcome where a minimum win trigger occurs, but the value of the main game play which includes the trigger is zero, so the minimum win activation period cannot start on a main game outcome which is not a winning outcome. This embodiment is also different from the second alternate embodiment of the method illustrated in FIG. 3 in that the EGM cannot allow an outcome where a minimum win trigger occurs but the main game outcome is not a winning one, so the player never sees a potential minimum win activation with no actual benefit to the player.

It will be understood by persons of ordinary skill in the art that embodiments presented herein can incorporate any kind of triggering event or condition, such as for example, the occurrence of a predetermined number of outcomes; the consecutive occurrence of a predetermined number of identical outcomes; the consecutive occurrence of a predetermined number of non-winning outcomes; a predetermined number of plays or exceeding a predetermined threshold of total winnings or credits, without limitation.

Regardless of the manner in which the minimum win trigger is established, the EGM can proceed to Step 314 and determine whether it is appropriate to play an additional or successive game. Where appropriate, the game can initiate 316 play of a successive game and evaluate the outcome of such game to determine 318 whether a winning outcome has been produced by play of the successive game.

Where a winning outcome is produced in a successive game, the game can determine 320 whether the value of the prize produced from the winning outcome of the successive play is larger than the current minimum win threshold. Where the value is larger, the value of the current minimum win threshold can be increased 322 to the value of the prize due for the winning outcome of the successive play and that prize can be awarded to the player. If the value of the prize produced from the winning outcome of the successive play is not larger than the current minimum winning threshold, the game can award 324 the current minimum win threshold.

A further refinement of the subject invention which can be added to either the implementation of the invention as a bonus game feature (FIG. 2) or the implementation of the invention as a main game feature (FIG. 3) to specifically allow, or specifically not allow, minimum win trigger events to occur during the later bonus game plays (if implemented as a bonus game feature) or during the minimum win activation period (if implemented as a main game feature.) If minimum win trigger events are specifically allowed to occur, this could reset the minimum win, or could extend the activation period, or both.

As will be understood by those of ordinary skill in the art, while the description above details the preferred and best mode(s) of practicing the invention, many other configurations and variations are possible. For example, the invention need not be practiced with a commercial/regulated gaming system, but could be used with a variety of coin-operated amusement devices, home gaming systems, or any other appropriate system. Accordingly, the scope of the invention should be determined not by the embodiment(s) illustrated, but by the claims below and their equivalents.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, any steps or actions referenced above or in the accompanying figures do not require the particular order shown, or sequential order, to achieve desirable results. Other steps may be provided, or steps may be eliminated, from the described methods, and other components may be added to, or removed from the described embodiments.

What is claimed is:

1. A method for playing a game comprising:

providing a set of instructions stored on a computer-readable medium for execution by a programmable processor;

determining a set of rules for the game including defining a set of outcomes which correspond to a set of triggering events and a set of prizes, wherein the set of outcomes includes outcomes which include triggering events, outcomes which include prizes, and outcomes which do not include triggering events or prizes;

receiving an input to initiate a main game play on a gaming machine and initiating the main game play on the gaming machine, the main game play being initiated by the processor and associated control circuitry;

evaluating an outcome of the main game play played on the gaming machine;

determining whether the outcome of the main game play included a bonus game triggering event;

initiating a first bonus game play on the gaming machine if the bonus game triggering event occurred, the first bonus game play being initiated by the processor and control circuitry;

evaluating an outcome of the first bonus game play;

determining whether the outcome of the first bonus game play corresponds to a first bonus prize, and where the outcome of the first bonus game play corresponds to the first bonus prize, adding the first bonus prize to a total bonus game play prize and setting a current minimum bonus prize to a value of the first bonus prize to produce a game providing a minimum award threshold for bonus prize outcomes from successive bonus plays and a greater total bonus game play prize from a plurality of bonus plays as compared to a conventional total bonus game play prize determined from prizes associated with individual prize outcomes from the plurality of bonus plays, the value of the current minimum bonus prize in a successive bonus game play after the first bonus game play being the greater of either (a) the value of the first bonus prize, or (b) a value of a bonus prize associated with the successive bonus game play outcome after the first bonus game, and detecting whether a bonus game terminating event has occurred, the bonus game triggering event and bonus game terminating event defining a minimum win activation period wherein the minimum award threshold is set by the processor and control circuitry, the minimum award threshold maximizing the total bonus game play prize.

2. The method of claim 1 further comprising initiating a second bonus game play after the first bonus game play and evaluating an outcome of the second bonus game play to determine whether it corresponds to a second bonus prize, and where the outcome of the second bonus game play corresponds to a second bonus prize, comparing a value of the second bonus prize to the value of the current minimum bonus prize.

3. The method of claim 2 further comprising setting the current minimum bonus prize equal to the value of the second bonus prize and adding the second bonus prize to the total bonus game play prize if the value of the second bonus prize is greater than the value of the current minimum bonus prize.

4. The method of claim 2 further comprising increasing the total bonus game play prize by an amount equivalent to the value of the first bonus prize if the value of the second bonus prize is less than the value of the current minimum bonus prize.

5. The method of claim 1 further comprising awarding the total bonus game play prize after a bonus game terminating event is detected.

6. The method of claim 1 further comprising accepting a wager.

7. The method of claim 1 further comprising ending the game where the outcome of the main game play did not include a bonus game triggering event.

8. The method of claim 1 further comprising ending the game where the outcome of the first bonus game play included a terminating event.

9. The method of claim 3 further comprising awarding the total bonus game play prize after a bonus game terminating event is detected.

10. The method of claim 4 further comprising awarding the total bonus game play prize after a bonus game terminating event is detected.

11. A method for playing a game comprising:

providing a set of instructions stored on a computer-readable medium for execution by a programmable processor;

determining a set of rules for the game including defining a set of outcomes which correspond to a set of triggering events and a set of prizes, wherein the set of outcomes includes outcomes which include triggering events, outcomes which include prizes, and outcomes which do not include triggering events or prizes;

receiving an input to initiate a first main game play on a gaming machine and initiating the first main game play on the gaming machine, the first main game play being initiated by the processor and associated control circuitry;

evaluating an outcome of the first main game play;

determining whether the outcome of the first main game play corresponds to a minimum win triggering event and a prize;

awarding the prize and setting a current minimum main game prize to a value of the prize where the outcome of the first main game play corresponds to a minimum win triggering event and a prize;

initiating a second main game play on the gaming machine after the first main game play and evaluating an outcome of the second main game play to determine whether it corresponds to a second prize, the second main game play being initiated and evaluated by the processor and associated control circuitry, comparing the value of the current minimum main game prize to a value of the second prize where the outcome of the second main game play corresponds to the second prize, the value of the current minimum main game prize in a successive main game play after the first main game play being the greater of either (a) the value of the first main game prize, or (b) a value of a main game prize associated with a successive main game play outcome after the first main game play, detecting whether a bonus game terminating event has occurred, and wherein the setting of the current minimum main game prize and comparing the value of the current minimum main game prize to the value of the second prize producing a game providing a minimum award threshold for prize outcomes from a plurality of main game plays and a greater total prize payout from the plurality of main game plays as compared to a conventional total prize payout determined from prizes associated with individual outcomes from the plurality of main game plays, the minimum win triggering event and minimum win terminating event defining a minimum win activation period wherein the current minimum award threshold is set by the processor and control circuitry, the minimum award threshold maximizing the total main game play prize.

12. The method of claim 11 further comprising initiating a plurality of minimum win game play events as determined by the set of rules where the outcome of first main game play corresponds to a minimum win triggering event.

13. The method of claim 11 further comprising setting the current minimum main game prize to the value of the second prize and awarding the value of the second prize where the value of the second prize is greater than the value of the current minimum main game prize.

14. The method of claim 11 further comprising awarding the current minimum main game prize if the value of the second prize is less than the value of the current minimum main game prize.

15. The method of claim 11 further comprising accepting a wager.

16. The method of claim 11 further comprising determining whether the outcome of the first or second main game play included a bonus game triggering event and initiating a first bonus game play if the bonus game triggering event occurred.

17. The method of claim 16 further comprising evaluating an outcome of the first bonus game play to determine whether the outcome of the first bonus game play corresponds to a first bonus prize, and where the outcome of the first bonus game play corresponds to a first bonus prize, adding the first bonus prize to a total bonus game play prize and setting a current minimum bonus prize to a value of the first bonus prize.

18. The method of claim 16 further comprising initiating a second bonus game play after the first bonus game play and evaluating an outcome of the second bonus game play to determine whether it corresponds to a second bonus prize and where the outcome of the second bonus game play corresponds to a second bonus prize, comparing a value of the second bonus prize to the value of the current minimum bonus prize.

19. The method of claim 18 further comprising setting the current minimum bonus prize equal to the value of the second bonus prize and adding the second bonus prize to the total bonus game play prize if the value of the second bonus prize is greater than the value of the current minimum bonus prize.

20. The method of claim 19 further comprising increasing the total bonus game play prize by an amount equivalent to the value of the first bonus prize if the value of the second bonus prize is less than the value of the current minimum bonus prize.

21. The method of claim 17 further comprising awarding the total bonus game play prize after a bonus game terminating event is detected.

22. A gaming machine comprising:

a programmable processor and control circuitry operatively connected to a control array and at least one electronic display, the processor receiving input received at the control array for play of the game and generating signals for producing visual imagery of the game on the display;

a set of instructions stored on a computer-readable medium for execution by the processor, the program:

providing a set of rules for the game including a set of outcomes which correspond to a set of triggering events and a set of prizes, wherein the set of outcomes includes outcomes which include triggering events, outcomes which include prizes, and outcomes which do not include triggering events or prizes;

accepting a wager from a player;

receiving an input to initiate a first play of the game and initiating a first play;

evaluating an outcome of the first play to determine whether it corresponds to a prize, and where the outcome corresponds to a prize, setting a current minimum prize to a value of the prize corresponding to the first play;

initiating a second play of the game and evaluating the outcome of the second play to determine whether it corresponds to a second prize, and where the outcome of the second play corresponds to the second prize;

comparing the value of the current minimum prize to a value of the second prize, the value of the current minimum prize in a successive play of the game after the first play of the game being the greater of either (a) the value of the prize corresponding to the first play, or (b) a value of a prize associated with a successive play after the first play, and wherein the setting of the current minimum prize and comparing the value of said current minimum prize to the value of the second prize producing a game providing a minimum award threshold for prize outcomes from a plurality of game plays and a greater total prize payout from the plurality of game plays as compared to a conventional total prize payout determined from prizes associated with individual outcomes from the plurality of game plays, a minimum win activation period being defined between at least one of the triggering events and a terminating event wherein the minimum award threshold is set by the processor and control circuitry.

23. The gaming machine of claim 22 further comprising awarding the second prize and setting the current minimum prize to the value of the second prize where the value of the second prize is greater than the value of the current minimum bonus prize.

24. The gaming machine of claim 22 further comprising awarding the current minimum prize where the value of the second prize is less than the value of the current minimum bonus prize.

* * * * *